3,494,978
METHOD OF ACCELERATING THE HARDENING OF EPOXY RESINS BY ADDING SODIUM ALCOHOLATES
Werner Moller, Dubendorf, Switzerland, assignor to Oerlikon Engineering Company, a corporation of Switzerland
No Drawing. Filed June 15, 1967, Ser. No. 646,192
Claims priority, application Switzerland, June 29, 1966, 9,446/66
Int. Cl. C08g 45/12, 30/12
U.S. Cl. 260—835               1 Claim

ABSTRACT OF THE DISCLOSURE 100 parts of anhydrous bis-phenol-A-diglycidyl-ether having an epoxy equivalent weight between 150 and 500 are mixed with from 0.015 to 0.15 part of sodium in the form of sodium alcoholate. To this mixture is added no more than 100 parts, and preferably 20 to 50 parts, of an unsaturated polyester resin containing a monomer and a peroxide. As a result of this mixture, premature gelation of the polyester resin at room temperature is avoided.

---

This invention relates to a method of accelerating the hardening of epoxy resins. U.S. Patent No. 3,316,215 describes an epoxy resin in which 100 parts by weight of an anhydrous bis-phenol-A-diglycidyl-ether, having an epoxy equivalent weight between 150 and 500, is caused to contain 0.015–0.15 part, by weight, of sodium in the form of an alcoholate. An approximately equivalent quantity of carboxyl anhydride hardener is added, whereupon the hardener reacts with the sodium to form a sodium salt, and this in turn facilitates the reaction of the activated hardener with the epoxy groups of the bis-phenol-A-diglycidyl-ether. The epoxy resin system obtained by this method has a long useful life at impregnation temperatures up to about 80° C., but at higher temperatures exhibits a very rapidly increasing reactivity.

It is known that to reduce the cost of manufacturing the resin system, mixtures of polyester resins and epoxy resins may be employed in cases where a reduction in quality of the resin system can be tolerated. However, conventional amine accelerators, used for accelerating the hardening of epoxy resins, catalyze unsaturated polyester resins with peroxides, thereby bringing about premature gelations at about 10° C. To avoid this, inhibitors must be added to the resin system. Since very small quantities of accelerators and, in particular, of inhibitors are employed, the entire resin system is extremely delicate. In addition to this, the proportion of accelerator in the resin system must be kept low, resulting in a high hardening temperature for the epoxy resin portion. A high hardening temperature of, for instance, 130° C. cannot, however, be maintained without damage, due to the high vapor pressure (500 mm. Hg) of the styrene contained in the polyester resin. Furthermore, at temperatures below 100° C., the exothermal reaction of the unsaturated polyester resin comes into play, so that the boiling point of the styrene is easily exceeded. Bubbles, cracks, and high internal stresses can occur and impair the mechanical and electrical properties, which is particularly undesirable in the case of polyester resin insulations.

The object of the present invention is to avoid the above-indicated disadvantages. In accordance with the invention, the method of accelerating the hardening of epoxy resins is characterized by the fact that up to 100 parts by weight of unsaturated polyester resin systems are added to the bis-phenol-A-diglycidyl ether in order to produce an epoxy resin/polyester resin mixture in which premature gelation of the polyester resin at room temperature is avoided.

In contradistinction to the epoxy resin system, the hardening of the polyester resin is not accelerated by employing the sodium alcoholate. The known polyester resin additions, such as monomers and peroxides, can be used as in the case of pure polyester resin systems. By the use of sodium alcoholate as the accelerator for the epoxy resin, the required hardening temperature for the epoxy resin decreases to the same temperature range, i.e., 80° to 100° C. as for the hardening of the polyester resin. Since a high temperature, such as 130° C., is not necessary for the hardening of the epoxy resin, the undesired formation of polystyrene, as well as the boiling of the styrene, and the formation of bubbles produced thereby, are also excluded. The epoxy resin/polyester resin mixture, with sodium alcoholate as the accelerator for the epoxy resin, furthermore has a low viscosity and good storage life, so that impregnation at room temperatures is permitted.

In itself, it is immaterial in which sequence the mixture of the epoxy resin system with the polyester resin system is effected. In order, however, to maintain a sufficiently low viscosity of the mixture components during mixing, it is advantageous to first add the sodium alcoholate, as the accelerator, and carboxyl anhydride, as the hardener, to the epoxy resin and then mix this system with the required quantity of an unsaturated polyester resin containing a monomer such as styrene, as a solvent, and a peroxide such as bi-benzol peroxide, as catalyst. The proportion by weight of the polyester resin, together with the additions just mentioned, should preferably not exceed 100% of the proportion of epoxy resin, since otherwise an undesirable degree of dilution of the sodium alcoholate occurs. The proportion by weight of the polyester resin system is preferably between 20% and 50% of the weight of the epoxy resin, for instance, about 35%.

EXAMPLE

To 100 parts, by weight, of a bis-phenol-A-diglycidyl ether, having between 150 to 500 epoxy equivalent weights, sodium alcoholate is added so that, depending upon the accelerating of the hardening required, the epoxy system contains 0.015 to 0.15 part, by weight, of sodium. An approximately equivalent quantity of carboxylic anhydride hardener is also added. This epoxy resin system is thereupon mixed with about 35 parts, by weight, of a polyester resin system which consists of an unsaturated polyester resin and additions of styrene and di-benzoyl peroxide.

What is claimed is:
1. A method of accelerating the hardening of an epoxy resin consisting essentially of incorporating from 0.015 to 0.15 part, by weight, of sodium alcoholate in 100 parts of a resin composed of anhydrous bis-phenol-A-diglycidyl-ether and having an epoxy equivalent weight between 150 and 500, adding thereto polycarboxyl acid anhydride hardener in a quantity equivalent to the quantity of sodium added, and adding thereto 20 to 50 parts, by weight, of an unsaturated polyester resin containing a monomer and a peroxide, in order to produce an epoxy resin/polyester resin mixture in which premature gelation of the polyester resin at room temperature is avoided.

References Cited

UNITED STATES PATENTS 3,252,923  5/1966  Salgado _____ 260—835
3,405,102  10/1968  Kugler _____ 260—835

FOREIGN PATENTS 6,502,178  2/1965  Netherlands.

SAMUEL H. BLECH, Primary Examiner

PAUL LIEBERMAN, Assistant Examiner

U.S. Cl. X.R.

260—78.4, 836, 837, 861